United States Patent [19]

Bernhardt et al.

[11] Patent Number: 4,950,394
[45] Date of Patent: Aug. 21, 1990

[54] ARRANGEMENT FOR DRIVING OUT VOLATILE IMPURITIES FROM GROUND WATER

[75] Inventors: Bruno Bernhardt, Reutlingen-Betzingen; Anton Hessner, Reutlingen; Rainer Krug, Trochtelfingen, all of Fed. Rep. of Germany

[73] Assignee: IEG Industrie-Engineering GmbH, Reutlingen, Fed. Rep. of Germany

[21] Appl. No.: 312,900

[22] Filed: Feb. 17, 1989

[30] Foreign Application Priority Data

Feb. 19, 1988 [DE] Fed. Rep. of Germany ....... 3805200
Apr. 11, 1988 [DE] Fed. Rep. of Germany ....... 3811926

[51] Int. Cl.⁵ ...................... E21B 43/00; B01D 29/04
[52] U.S. Cl. ...................... 210/170; 166/51; 166/57; 166/233; 166/236; 210/220; 210/242.1
[58] Field of Search ........... 166/51, 56, 57, 60, 166/228, 230, 233, 236, 246, 244.1, 268, 272, 278, 279, 227; 210/170, 220, 221.1, 221.2, 242.1, 175; 405/128

[56] References Cited

U.S. PATENT DOCUMENTS

| 1,648,925 | 11/1927 | White | 166/228 |
| 2,035,313 | 3/1936 | Griffin | 166/230 |
| 2,179,020 | 11/1939 | Ranney | 166/230 |
| 3,482,267 | 12/1969 | Nebolsine | 166/51 |
| 4,071,087 | 1/1978 | Ingerle et al. | 166/278 |
| 4,272,375 | 6/1981 | Pollock | 210/221.1 |
| 4,401,569 | 8/1983 | Jhaveri et al. | 210/170 |
| 4,582,610 | 4/1986 | Baker | 210/170 |
| 4,583,594 | 4/1986 | Kojicic | 166/51 |
| 4,779,682 | 10/1988 | Pelzer | 210/170 |

FOREIGN PATENT DOCUMENTS

| 3625488 | 10/1987 | Fed. Rep. of Germany | 166/268 |
| 0378734 | 4/1973 | U.S.S.R. | 210/220 |
| 794119 | 1/1981 | U.S.S.R. | 166/227 |
| 0885463 | 11/1981 | U.S.S.R. | 166/57 |
| 1094920 | 5/1984 | U.S.S.R. | 166/60 |
| 893869 | 4/1962 | United Kingdom | 166/78 |
| 1459418 | 12/1976 | United Kingdom | 210/220 |

Primary Examiner—Frank Spear
Assistant Examiner—Joseph Drodge
Attorney, Agent, or Firm—Michael J. Striker

[57] ABSTRACT

An arrangement for driving out volatile impurities from a ground water with a well shaft extending to the region of the ground water to be purified, the arrangement comprises an element for producing a negative pressure in the well shaft and supplying a gas underneath a water level in the well shaft, an element for providing a plurality of capillary openings in an upper sieve wall portion of the well shaft at least in a purification region between a gas inlet and a water level in the well shaft to enhance a laminary flow of ground water with relatively high speed, the capillary openings forming a greater free throughflow surface than a remaining portion of the well shaft.

24 Claims, 6 Drawing Sheets

ARRANGEMENT FOR DRIVING OUT VOLATILE IMPURITIES FROM GROUND WATER

BACKGROUND OF THE INVENTION

The present invention relates to an arrangement for driving out volatile impurities from the ground water and from ground through which it flows. More particularly, it relates to the arrangement of the above mentioned type in which the driving out is performed by producing a negative pressure in a well shaft extending to the region of the contaminated ground water and supplying a gas, especially fresh air underneath the water level of the well shaft.

Arrangements of the above mentioned general type are known in the art. One such arrangement is disclosed for example in the German document DE-OS 3,625,488. In contrast to the conventional methods, in which pressure air is pressed with considerable energy consumption into the ground which surrounds a well shaft and-/or into the ground water collected in the well shaft, with the arrangement disclosed in the above mentioned reference air alone under the action of the negative pressure formed in the water-free region of the well shaft or the action of very low negative pressure is supplied for driving out of the impurities. It has been shown that with relatively low negative pressure, surprisingly high quantities of volatile impurities in gaseous state can be aspirated and a significantly higher efficiency is obtained than in conventional methods. In conventional methods under the action of the high pressure the laminar flows are destroyed and whirling is formed, whereby the efficiency of the arrangement is significantly reduced. Moreover, during pumping-in the pressure air into the ground or pumping-out the ground water, the impurities which are distributed nonuniformly in the ground are driven or pulled to noncontaminated regions.

SUMMARY OF THE INVENTION

Accordingly, it is an object of the present invention to provide an arrangement of the above mentioned type which avoids the disadvantages of the prior art.

More particularly, it is an object of the present invention to provide an arrangement of the above mentioned type which is improved in that the liquid flow in the contaminated ground which surrounds the well shaft is enhanced to provide an efficiency increase of driving the impurities.

In keeping with these objects and with others which will become apparent hereinafter, one feature of the present invention resides, briefly stated, in that the limiting wall of the well shaft is provided, at least in the region between the air inlet and the water table, with a plurality of fine capillary openings which produce a laminar liquid flow with relatively high speed, and a greater free throughflow or passage surface than in a remaining region of the limiting wall of the well shaft.

When the arrangement is designed in accordance with the present invention the air-throughflow of the well shaft is formed so that under the action of the air throughflow, ground water which is completely or considerably cleaned from the volatile impurities and simultaneously enriched in oxygen, is discharged in increased quantity through the fine capillaries of the well shaft wall to the surrounding ground. The air which is discharged from a nozzle causes the water column located above the nozzle to move. The thus produced pulse-like oscillating hydraulic pressure is sufficient for driving out the ground water (from which the volatile impurities have been completely or considerably removed by the air admixture and which is enriched simultaneously with oxygen) through the fine-capillary wall of the well shaft to the surrounding ground. It is also sufficient for enhancing the annular flow with the increased ground water inflow in the region of the bottom of the well shaft, into the surrounding area of the well shaft. The ground water forced to discharge into the region located close to the ground water table, applies by its natural gravity force a vertical pressure to the lower ground water layers thereby producing the above mentioned ground water movement.

It has been shown that this ground water which is enriched with air, has considerable surrounding radius which can be influenced by the value of the negative pressure in the well shaft, can move back in the vicinity of the ground water level in the ground before it sinks downwardly into deeper ground water layers. Thereby the annular flow formed in the surrounding area of the well shaft with increased ground water inflow in the bottom region of the well shaft, is enhanced. The purified ground water which is forced for increased discharge into the region which is closed to the ground water table, applies due to its natural gravity force a vertical pressure to the over ground water layers and thereby forces the above mentioned circular ground water movement around the well shaft with intensification of the ground water inflow in the bottom region of the well shaft. Simultaneously the desired vertical flow of the ground water from the lower region of the well shaft to its upper purification region is supported.

The movement of the purified and oxygen-enriched ground water, which is first discharged from the region located near the ground water horizontal table downwardly, for rinsing the bottom layers which can have different densities, is especially enhanced when the wall of the well shaft is formed filter-like in its bottom region as well. The remaining wall region is maintained water-impermeable. The whole process is performed without high pressure drops and thereby without distortion of a laminar flow of the ground water. Practical experiments have shown that a purification of the contaminated ground water region with the arrangement in accordance with the present invention can be performed in a short time. The above mentioned advantageous action is confirmed by pressure and flow measurements in the well shaft and in the ground surrounding the well shaft.

An important advantage of the present invention is that impurities are transported to only those water-filled ground regions in which they had been present and distributed, and not to adjacent non-contaminated ground regions. Respective conditions of the low pressure prevent diversion of a greater part of ground water pulled by the air, into fog or water steam, which otherwise can be aspirated by the negative pressure generated and reduce the efficiency of a filter device connected therewith.

The arrangement in accordance with the present invention is also favorable for biological purification of contaminated ground. Aerobic microbes can be introduced with the fresh air so that they can be supplied with the ground water discharged through the capillaries into the ground and there contribute to the cracking of the carbon molecules.

Advantageously the wall reinforcement of the well shaft in the air-throughflow ground water region between the air inlet and the water table can be formed by two sieve concentric walls arranged at a distance from one another. The walls can be supported relative to one another by supporting webs or additional sieve wall parts, and their intermediate space can be filled with a granulate which forms fine capillary passages. The wall reinforcement of another well shaft region can be formed by known well shafts with slot bridge openings or without openings.

Under the action of the negative pressure in a ground water-free upper region of the well shaft, gases can be aspirated from the ground water-free ground region into the well shaft. In very porous soils this fraction can be so high that it significantly affects the action of the negative pressure on the ground water table. In this case, the arrangement advantageously is provided with a hose bellows-shaped foil wall which prevents the aspiration of gases into the ground water-free region of the well shaft. The foil wall can be anchored at its lower end with a floating body. The float can form a support for a sieve wall which is arranged at a distance from a water, table and used for distributing the supplied fresh air in the ground water of the well shaft.

In order to additionally improve the vertical flow of the ground water in the well shaft, at least one nozzle shaft can be provided in an air chamber of the nozzle and extend through an upper nozzle wall. In the region of the air chamber the nozzle shaft is provided with a plurality of air inlet openings. Advantageously, several such nozzle shafts composed of pipe portions can be uniformly distributed in the nozzle. The fresh air can be supplied through a central opening of the upper nozzle wall provided with nozzle openings and to several nozzle shafts to provide a uniform air distribution. The nozzle shafts form raising passages for the ground water and through the air chamber of the nozzle so that the ground water in high quantities can flow from below the nozzle into the water purification zone located above the nozzle. In the region of the air chamber of the nozzle, fresh air penetrates through the air inlet openings in the nozzle shafts and produces raising in the nozzle shaft a suction which aspirates the ground water into the lower ends of the nozzle shaft.

In addition to the advantage of forming the ground water throughflow through the nozzle, the arrangement of the nozzle shafts can also bring the ground water from predetermined depth of the well shaft to the purification zone. This can be achieved by providing the nozzle shafts of respective lengths. In addition, the nozzle shafts can also be provided with the lower ends formed so as to attach extension shafts.

When needed, transverse partitions can also be mounted on the nozzle shafts if it is necessary to seal a lower region of the well shaft, for example from tensioned ground water. This is especially advantageous in the cases when healing or mineral water from great depths can be subjected to a purification by gasification. Such partitions are also used when a well shaft drilled downwardly through a contaminated soil region and it is necessary to prevent sinking of the purified ground water from the lower region of the well shaft downwardly to non-purified soil region.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
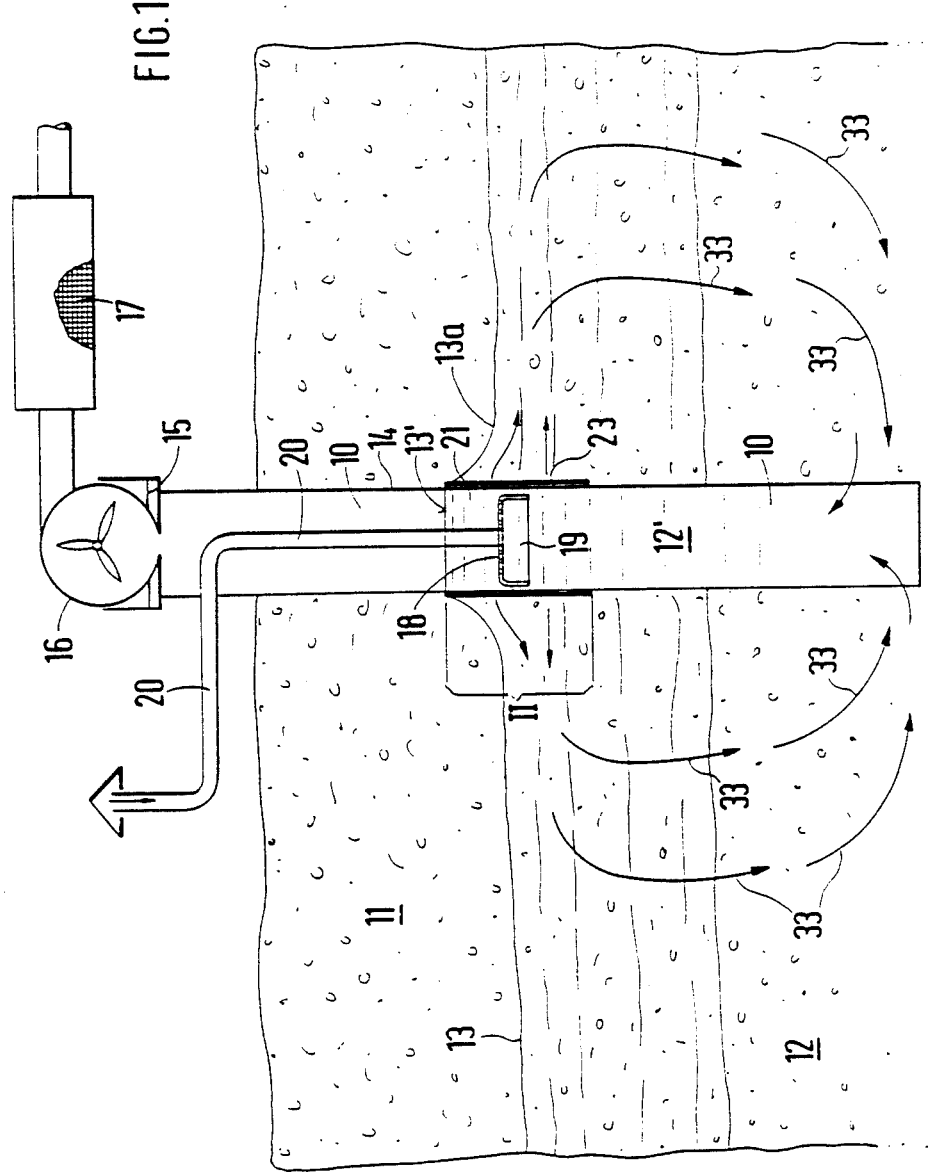
FIG. 1 is a view which schematically shows an arrangement for driving out volatile impurities from ground water in accordance with the present invention.

FIG. 1 schematically shows a well shaft 10 which was driven into a ground region 11 contaminated with hydrocarbon chloride, to a ground water region 12. A line 13 identifies the ground water table. The wall of the well shaft is reinforced with known interrupted well pipes 14. The upper end of the well shaft is closed with a cover 15 in an air-tight manner. A ventilator 16 is arranged on the cover 15 for producing a negative pressure in the well shaft. The air which is aspirated by the ventilator 16 from the well shaft 10 is discharged through a filter 17 into the atmosphere. Under the action of the negative pressure in the well shaft 10, the ground water table in the well shaft and the surrounding ground region is lifted in correspondence with a line region 13a. The table of the ground water inside the well shaft 10 is identified with reference numeral 13'.

A bell-shaped sieve plate 18 is arranged inside the well shaft 10 in the ground water 12' with a distance above the ground water level 13'. An air conduit 20 extends in an inner chamber 19 of the bell through the well shaft 10. Fresh air is supplied from outside through the air conduit 20 and raises through the sieve opening of the sieve plate 18 which is spaced a predetermined amount from the water table 13' in form of individual air bubbles to the liquid table 13'. In a cleaning region 21 of the well shaft this air entrains the volatile matter contained in the ground water 12' and discharges the same.

Figure 2:
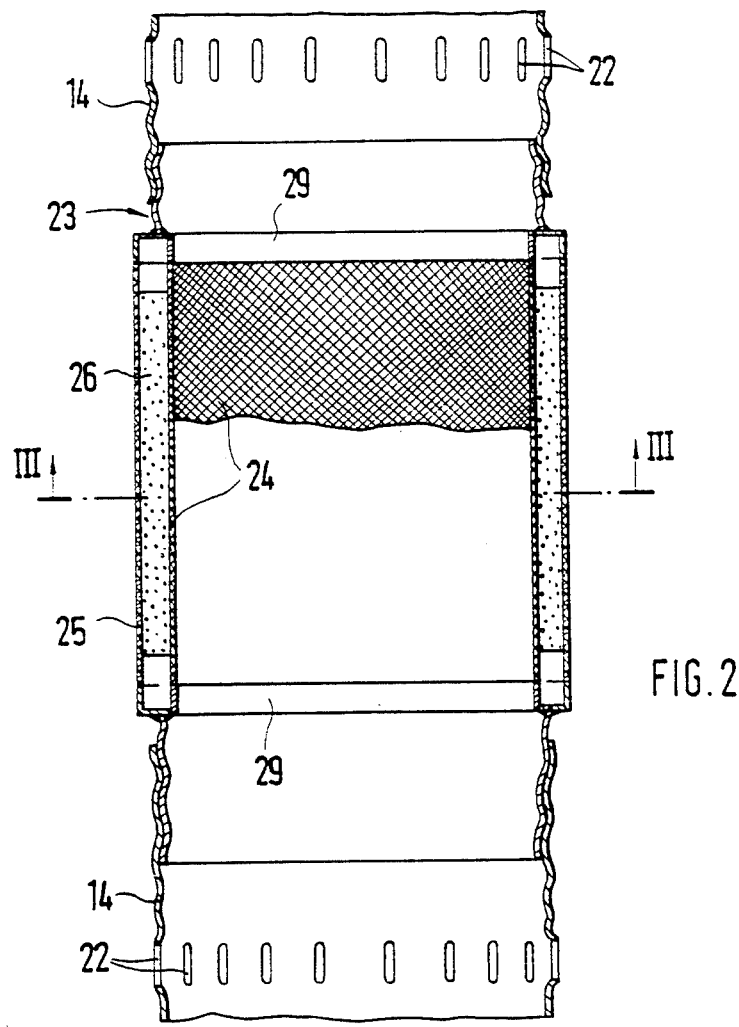
FIG. 2 is a view showing a fragment II of a well shaft and a limiting wall in FIG. 1, on an enlarged scale.
Figure 3:
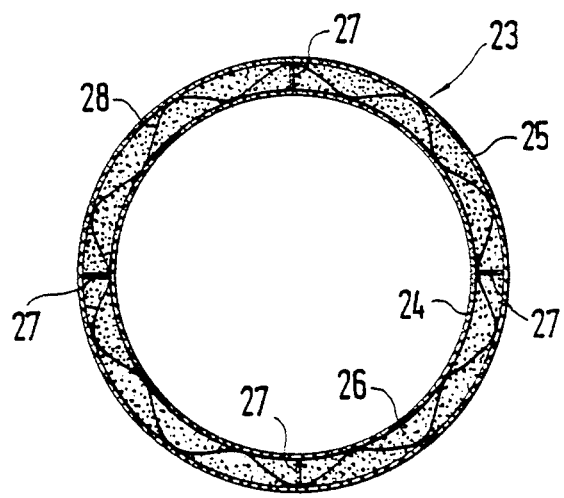
FIG. 3 is a view showing a section taken along the line III—III in FIG. 2.

In the region which is identified in FIG. 1 with reference numeral II the wall of the well shaft 10 is designed differently and not provided with the conventional slotted well pipe. FIGS. 2 and 3 show this wall region in which a filter pipe 23 is inserted between the known well pipes provided with a slot bridge opening 22. The filter pipe 23 has an inner sieve wall 24 and an outer sieve wall 25. They are arranged at a distance from and concentrically to one another. They can be composed of metal or synthetic plastic material. The walls have a greater permeability than the adjoining well pipes 14. The intermediate space which is formed between both sieve walls 24 and 25 is filled with a granulate 26. As can be seen from FIG. 3, both sieve walls 24 and 25 are supported relative to one another by radially extending webs 27 and a meander-shaped inner sieve wall 28. At their inner upper end and their inner lower end the sieve walls 24 and 25 are reinforced by limiting rings 29. The granulate provide for a plurality of fine capillary passages through which the ground water can flow in a laminar flow with relatively high flow speed.

Figure 4:
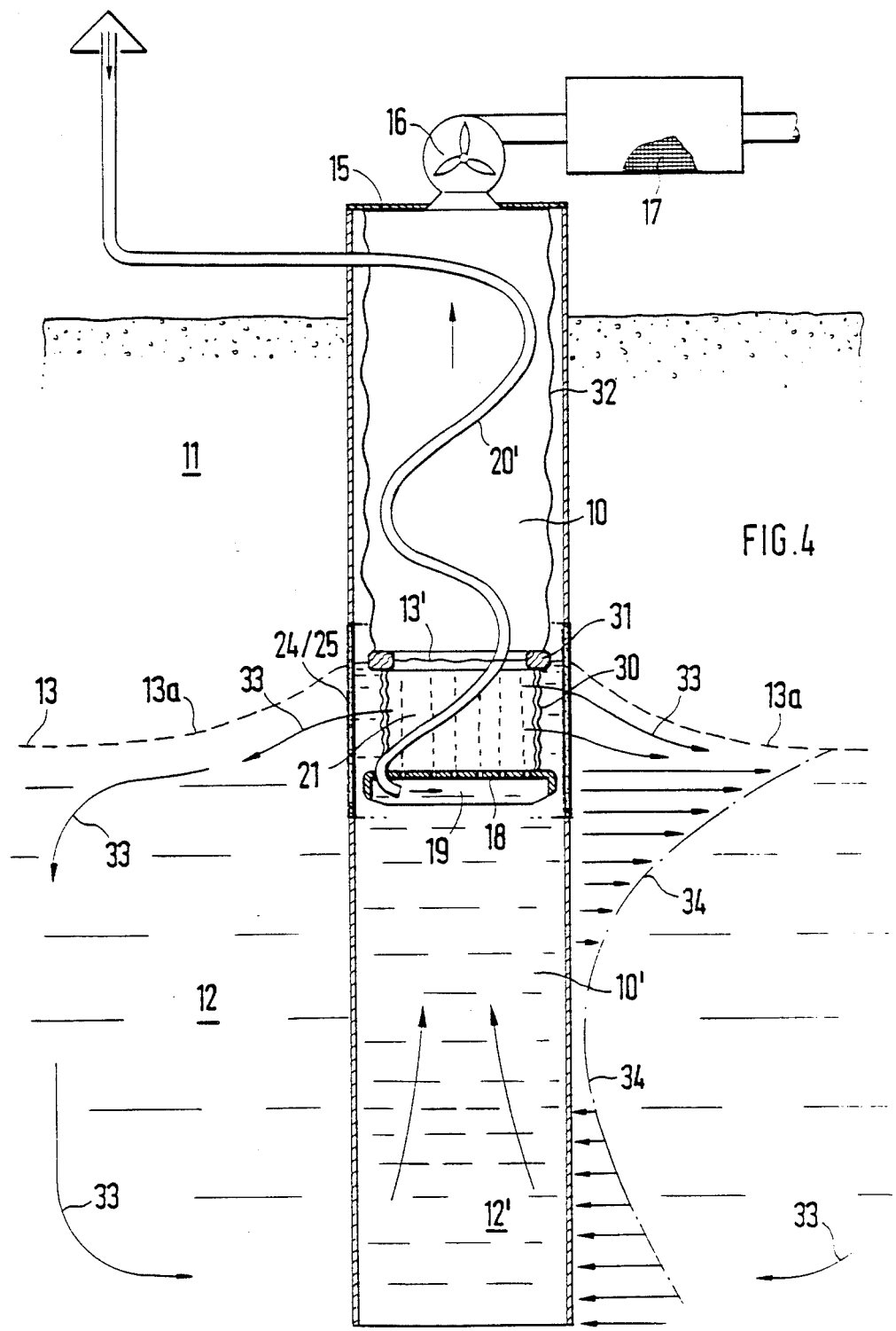
FIG. 4 is a view showing additional details of the arrangement of FIG. 1.

FIG. 4 shows a preferable embodiment of the arrangement in accordance with the present invention. In this embodiment the bell-shaped sieve plate 18 is suspended on a floating ring 31 through chains 30. The air conduit 20' is formed as a flexible hose. Between the cover 15 which closes the well shaft 10 and the floating ring 31 a hose bellows wall 32 is provided. It prevents the penetration of gases from the ground 11 above the ground water table 13 into the well shaft 10. The raising fresh air bubbles are shown as pearl chains in the cleaning region 21 between the sieve plate 18 and the liquid table 13 of the well shaft 10. The ground water located in the cleaning region 21 moves due to bubble induced to oscillations, upwardly together with the bubbles and then moves downwardly along the wall. A greater part of it flows outwardly through the sieve walls 24 and 25.

The vibrations improve the lateral discharge of the ground water through the capillary openings of the sieve walls 24 and 25. A circular flow of the ground water takes place in the vicinity of the well shaft 10, as identified in FIG. 1 with the arrow 33. The expansion of this circular stream into the surrounding area of the well shaft 10 can be influenced by the power of the negative pressure produced in the well shaft which is free of the ground water. In the upper third of the well shaft region 10; in which the ground water 12' flows predominantly outward, the outflow of the ground water is especially strong in the region of the sieve walls 24 and 25. In the lower half of the well shaft region 10' in contrast, the inflow of the ground water into the well shaft is predominant. This is shown in FIG. 4 by a pressure distribution curve 34 identified with a dash-dot line. Because of this circular flow formation, an upward stream of the ground water 12' from the lower region of the well shaft is produced in the interior of the well shaft 10.

Figure 5:
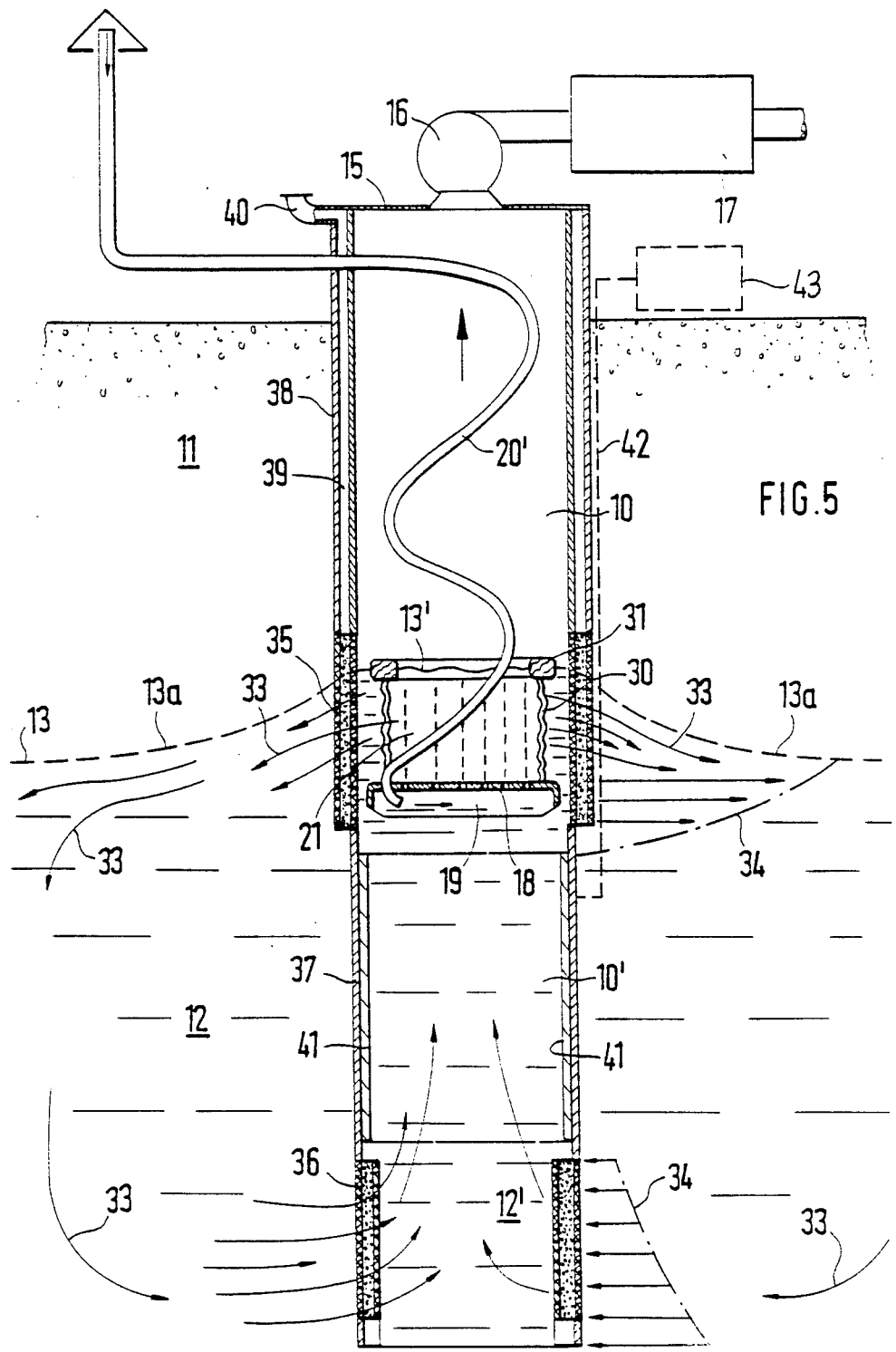
FIG. 5 is a view substantially corresponding to the view of FIG. 4, but showing an arrangement in accordance with another embodiment of the present invention.

FIG. 5 shows a different embodiment of the inventive arrangement. In this embodiment, the well shaft 10 up to a sieve wall region 35 corresponds to the sieve wall region 24/25 of the previous embodiment. Then over a lower sieve wall region 36 it is coated with water-impermeable enclosures 37. In the region which is free from the ground water up to the upper sieve wall region 35, double-walled water-impermeable enclosures 38 are provided. In this arrangement an inflow and a backflow of the ground water can occur only through the lower sieve region 36, whereby the ground water circulation in the area surrounding the well shaft 10 is further increased. This arrangement is designed for a biological cleaning of the contaminated ground. An aqueous nutrient solution mixed with microbes can be supplied into an annular chamber 39 of the double-walled enclosure 38 through an upper inlet 40. It flows to the sieve wall region 35 and there is entrained by the ground water which discharges through the sieve wall region 35 outwardly and is enriched with oxygen, to flow to the surrounding ground. Before increasing the biological purification effect, the inner side of the water-impermeable wall enclosure 37 of the arrangement is provided with an electrical heating body coating 41 for heating the ground water located in the well shaft 10. This creates a favorable temperature for the growth of the microbes. A conduit 42 connects the coating 41 with a heat source 43.

Figure 6:
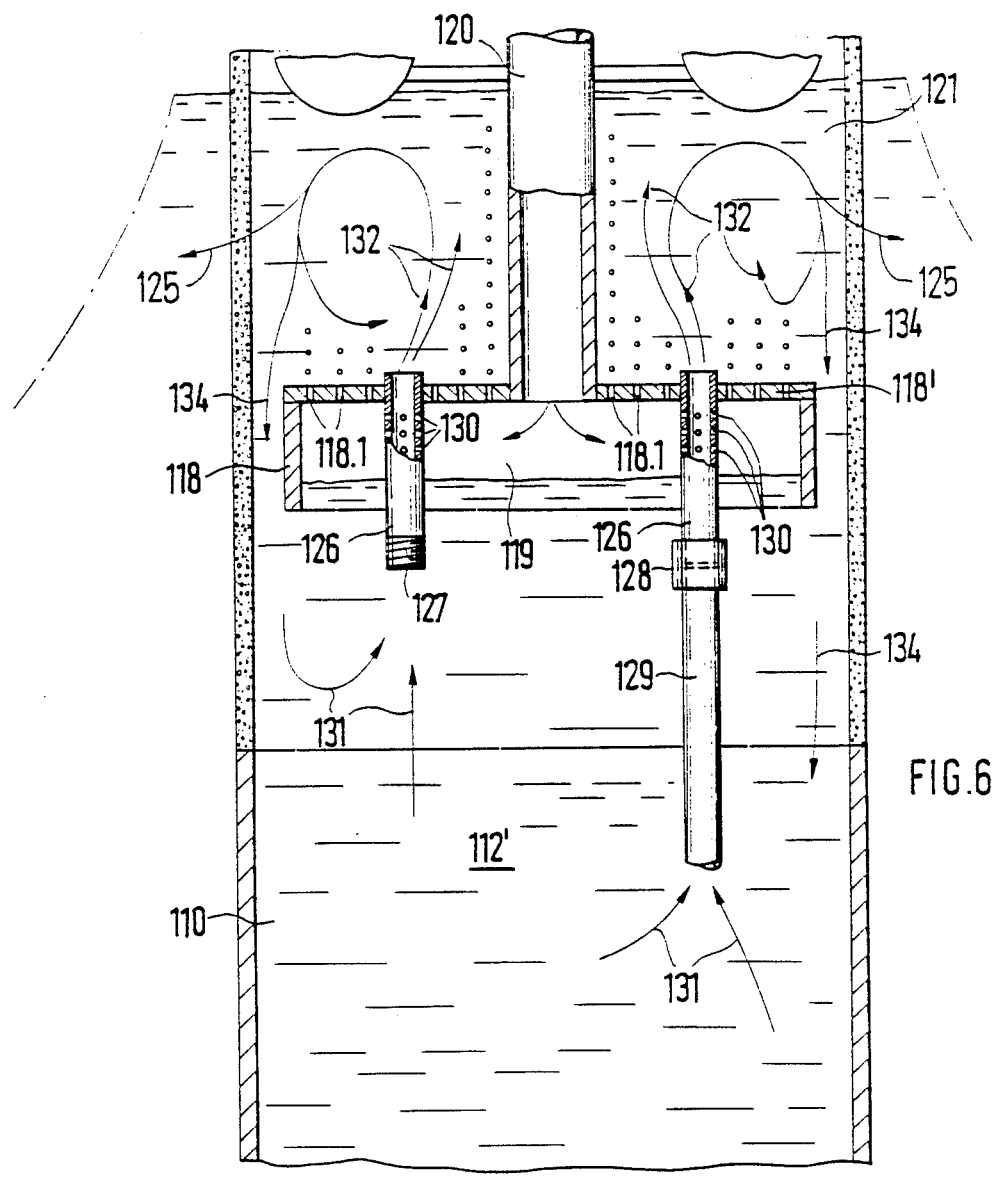
FIG. 6 is a view showing a region of a well shaft with a nozzle and nozzle shafts, on an enlarged scale as compared with FIG. 1.

FIG. 6 shows a further embodiment of the arrangement in accordance with the present invention. In this embodiment a nozzle body 118 is provided. Its upper limiting wall 118' has a plurality of nozzle pipes 126 which are distributed uniformly and at identical distances from the central air supply pipe 120. The nozzle pipes 126 extend in the longitudinal direction of the well shaft 110. The nozzles pipes are above the limiting wall 118, extend through an air chamber 119 which is formed in the nozzle member 118, and end below the air chamber 119 in the well shaft 110 filled with the ground water 112'. In the region of their lower ends the nozzle pipes are provided with an outer thread 127 whereby they can be connected with extension pipes 129 by threaded bushes 128.

The walls of the nozzles pipes 126 are provided with air inlet openings 130 in the region of the air chamber 119 underneath the nozzle limiting wall 118' which forms a nozzle plate. Air which flows through the air inlet openings 130 from the air chamber 119 into the nozzle pipes 126 produces a suction which aspirates the ground water 112' as shown by the arrow 131. In the purification region 121 it is transported upwardly through the air chamber region 119.

Reinforced circulating movement of the ground water develops through the nozzle pipes 126 in the purification region 121 of the well shaft 110 and is identified with the arrow 132. A part of this flow is discharged outwardly in direction of the arrow 125 through the filter wall 123, while another part moves in the direction of the arrow 134 downwardly to the nozzle member 118.

Figure 7:
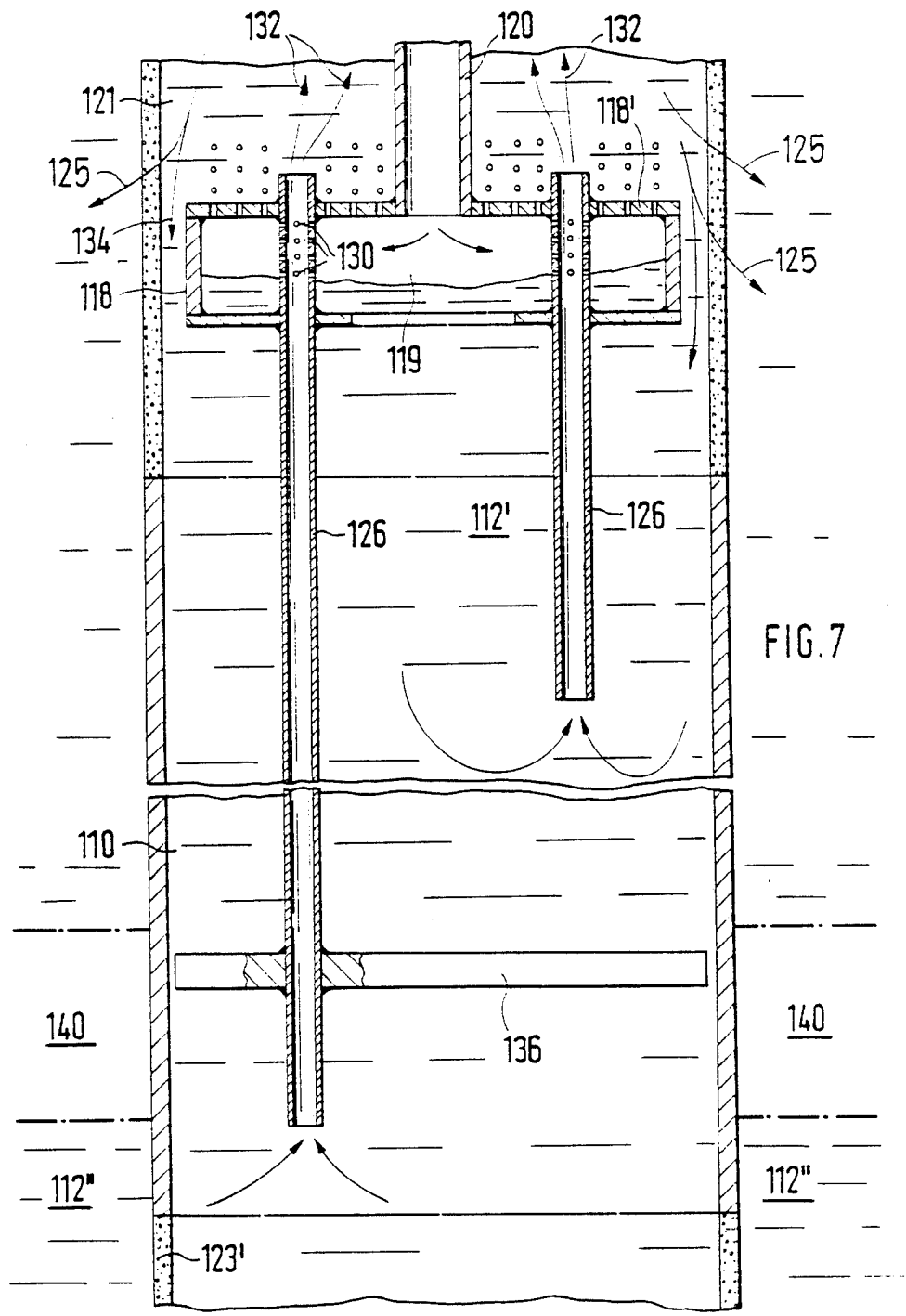
FIG. 7 is a view substantially corresponding to the view of FIG. 6 but showing a further embodiment of the nozzle with the nozzle shaft.

FIG. 7 shows a further embodiment of the arrangement, in accordance with the present invention. In this embodiment the nozzle pipes 126 are formed with different lengths. A partition 136 is mounted on the longer nozzle pipes of which only one nozzle pipe is shown. The partition 136 subdivides the well shaft 110. It is arranged on the height of a watertight ground layer 140, under which pressurized ground water 112" is collected and presses through a lower filter wall region 123' of the well shaft coating into the well shaft 110. When desired, the pressurized ground water 112' is guided through the nozzle pipe 126 which extends through the partition 136, upwardly into the purification region 121. The long nozzle pipes 126 which are supported in the partition 136 can be closed at their lower ends, and instead lateral water inlet openings can be provided above the partition 136. This can be done when it is desired to convey upwardly only the base water 112' from the well shaft region located above the partition 136 to the purification region 121.

In the well shafts provided with the arrangement in accordance with the embodiments of FIGS. 6 and 7, an inner ground water circulation through the purification region 121 is reinforced and simultaneously, a vertical ground water movement to the surrounding area of the well shaft is intensified. Instead of the individual nozzle pipes 126, it is also possible to provide nozzle shafts which are designed in a different manner, for example as nozzle shafts with a cross-section shaped as a hollow ring segment.

It will be understood that each of the elements described above, or two or more together, may also find a useful application in other types of constructions differing from the types described above.

While the invention has been illustrated and described as embodied in an arrangement for driving out volatile impurities from ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for removing volatile impurities from a ground water, comprising a well shaft extending to a region of the ground water to be purified and having upper and lower sieve wall portions defining a water table in said well shaft; means for producing negative pressure in said well shaft; means for supplying a gas beneath the water table in said well shaft and including an inlet means located beneath the water table, within said upper wall portion spaced from the water table; and means forming a plurality of capillary openings in said upper sieve wall portion at least in a purification region between said inlet and the water table in said well shaft, to enhance a laminary flow of the ground water with a relatively high speed, said plurality of capillary openings forming a free passage area which has a greater permeability than a free passage area an adjacent portion of said well shaft.

2. An arrangement as defined in claim 1, wherein said means forming said capillary openings includes two sieve walls which are arranged one inside the other and form an intermediate space therebetween, and a granulate which fills said intermediate space and forms a plurality of capillary passages.

3. An arrangement as defined in claim 2, wherein said sieve walls are arranged concentrically relative to one another.

4. An arrangement as defined in claim 2, wherein said means forming said capillary openings further includes supporting webs which support said sieve walls relative to one another.

5. An arrangement as defined in claim 2, wherein said means forming said capillary openings further includes an additional sieve wall extending between said two sieve walls and supporting said two sieve walls relative to one another.

6. An arrangement as defined in claim 1; and further comprising means for reinforcing the remaining portion of the well shaft and including a enclosure provided with slot bridge openings.

7. An arrangement as defined in claim 1 wherein said gas supplying means further includes a floating body on which said sieve wall is anchored, a foil wall supported on said floating body and extending up to a well shaft opening for preventing aspiration of gas from soil surrounding the well shaft.

8. An arrangement as defined in claim 7, wherein said foil wall is formed as a hose bellows-shaped wall.

9. An arrangement as defined in claim 1; and further comprising means for forming further capillary openings in said bottom sieve wall portion of the well shaft and providing a laminary flow with a relatively high speed, said further capillary openings forming a free passage area which has a greater permeability than a remaining passage area of the adjacent portion of the well shaft.

10. An arrangement as defined in claim 9, wherein said means forming said further capillary openings includes a sieve wall region.

11. An arrangement as defined in claim 9; and further comprising means for imparting water-impermeability to the remaining portion of the well shaft.

12. An arrangement as defined in claim 11, wherein said imparting means includes water-impermeable enclosures.

13. An arrangement as defined in claim 1; and further comprising heating means associated with the well shaft in a region under the water table and including a plurality of heating bodies.

14. An arrangement as defined in claim 1; and further comprising heating means associated with the well shaft in a region under the water table and including a plurality of heating surfaces.

15. An arrangement as defined in claim 1; and further, comprising a double-walled water-impermeable enclosure for insulating the well shaft in a region which is free of the ground water.

16. An arrangement as defined in claim 1; and further comprising a nozzle arranged in the well shaft and having an upper nozzle wall and a gas chamber, and at least one nozzle shaft extending through said nozzle wall downwardly into said gas chamber and provided with a plurality of gas inlet openings in the region of said gas chamber.

17. An arrangement as defined in claim 16, wherein said nozzle shaft is formed as a tubular portion.

18. An arrangement as defined in claim 16, wherein said nozzle shaft has a lower end formed for mounting of an extension shaft.

19. An arrangement as defined in claim 16, wherein said upper nozzle wall is perforated and has a central opening for receiving the gas and a plurality of further openings uniformly distributed over said upper nozzle wall and formed for receiving a plurality of said nozzle shafts.

20. An arrangement as defined in claim 16, wherein said nozzle shaft extends in a longitudinal direction and is provided with a partition which subdivides the well shaft and is located transversely to the longitudinal direction, said nozzle shaft extending through said partition.

21. An arrangement as defined in claim 16; further comprising means for rendering the well shaft water-permeable at least in a region of the well shaft which is located beneath said nozzle and is spaced therefrom.

22. An arrangement as defined in claim 21, wherein said means for rendering the well shaft water-permeable includes filter pipes.

23. An arrangement as defined in claim 22, wherein said nozzle shaft extends in a longitudinal direction and is provided with a partition which subdivides the wall shaft and extends transversely to the longitudinal direction, said means for rendering said well shaft water permeable being located under said partition.

24. An arrangement for removing volatile impurities from a ground water, comprising: a well shaft extending to a region of the ground water to be purified and having upper and lower sieve wall portions defining a water table in said well shaft; means for producing negative pressure in said well shaft; means for supplying a gas beneath the water table in said well shaft and including an inlet located beneath the water table within said upper wall portion spaced from the water table; means forming a plurality of capillary openings in said upper sieve wall portion at least in a purification region between said inlet and the water table in said well shaft, to enhance a laminary flow of the ground water with a relatively high speed said plurality of capillary openings forming a free passage area which has a greater permeability than a free passage area of an adjacent portion of said well shaft said inlet means comprising; a nozzle arranged in said well shaft and having an upper nozzle wall and a gas chamber; and a plurality of nozzle shafts extending through said nozzle wall downwardly into said gas chamber and provided with a plurality of gas inlet openings in a region of said gas chamber, said nozzle shafts having different lengths and having lower ends which are spaced by different distances from said nozzle.

* * * * *